US008342965B2

(12) United States Patent
Hwang et al.

(10) Patent No.: US 8,342,965 B2
(45) Date of Patent: Jan. 1, 2013

(54) DISPLAYING A GAME MENU SCREEN BY FLASH PROGRAM MODULE IN AN ON-LINE GAME APPLICATION

(75) Inventors: Min-Jae Hwang, Seoul (KR); Hyun-Chang Lee, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 1495 days.

(21) Appl. No.: 11/864,615

(22) Filed: Sep. 28, 2007

(65) Prior Publication Data

US 2008/0102959 A1 May 1, 2008

Related U.S. Application Data

(63) Continuation of application No. PCT/KR2006/001198, filed on Mar. 31, 2006.

(30) Foreign Application Priority Data

Mar. 31, 2005 (KR) .................. 10-2005-0027213

(51) Int. Cl.
A63F 9/24 (2006.01)
(52) U.S. Cl. .................................... 463/42; 715/810
(58) Field of Classification Search .............. 715/810; 463/42
See application file for complete search history.

(56) References Cited

U.S. PATENT DOCUMENTS

2004/0242322 A1* 12/2004 Montagna et al. .............. 463/29
2010/0144446 A1*  6/2010 Oh .................................. 463/42

FOREIGN PATENT DOCUMENTS

| KR | 10-2000-0050205 A | 8/2000 |
| KR | 10-2002-0025147 A | 4/2002 |
| KR | 10-2002-0076846 A | 10/2002 |
| KR | 10-2004-0094254 A | 11/2004 |

* cited by examiner

*Primary Examiner* — Corbett B Coburn
(74) *Attorney, Agent, or Firm* — H.C. Park & Associates, PLC

(57) ABSTRACT

A recorded medium comprises a FLASH program module including FLASH program module graphic data and action scripts associated with the FLASH program module graphic data. The FLASH program module analyzes the FLASH program module graphic data and the action scripts. A platform program installed on a client transmits the functionality necessary for game processing through communication with a game server. When a user requests information which requires communication with the game server, the FLASH program module provides a parameter associated with the user request to the platform program. The platform program analyzes the parameter, requests the information from the game server and provides the information to the FLASH program module.

10 Claims, 5 Drawing Sheets

DISPLAYING A GAME MENU SCREEN BY FLASH PROGRAM MODULE IN AN ON-LINE GAME APPLICATION

CROSS-REFERENCE TO RELATED APPLICATIONS

This application is a Continuation of International Application No. PCT/KR2006/001198, with an international filing date of Mar. 31, 2006, which claims the benefit of Korean Application No. 10-2005-0027213, filed Mar. 31, 2005, the complete disclosures of which are incorporated herein by reference.

TECHNICAL FIELD

The present invention relates to a method and recorded medium for displaying an online game menu screen by FLASH program module in an on-line game application.

BACKGROUND

Along with the development of the Internet, on-line games (which are different from a package format game) are becoming increasingly popular. On-line games include many kinds of games such as RPGs (Role playing game), shooting games, board games and so on. On-line games are popular because competition with other on-line users is possible unlike in package format games.

A service provider may provide various kinds of games such as go-stop, porer, baduk, block games and so on, where users select a game to play from a web page of the game site.

When a user selects a game, channel information is transmitted. The user then selects a game room among the game rooms generated in the selected channel to play the game.

When a user selects a game, an application corresponding to the selected game is executed by the control of web page script or ActiveX Control. The application provides a menu screen by which users can select a channel and a game room.

Conventionally, a menu screen by which users select a channel and a game room is provided by an application. A programmer programs the menu screen using a graphic display interface (GDI) and other tools, which requires much design time.

Graphics implemented by the application are in a fixed form. Thus, a screen with having an improved design can not be provided.

Although tools including a FLASH program module can provide improved graphics, a FLASH program module can transmit and receive only text data in a socket communication. Thus, a FLASH program module has many disadvantages in server communication. Therefore, when FLASH program module data is used for an on-line game menu screen, a full FLASH program module menu screen cannot be implemented using conventional methods.

SUMMARY

In order to solve the above-mentioned problems, the present invention provides a method and recorded medium for implementing and displaying an on-line game menu screen by FLASH program module.

The present invention also provides a method and recorded medium that can provide a game menu screen with improved graphics while reducing the time required for designing the game menu screen.

Furthermore, the present invention provides a method for displaying a flash-implemented game menu screen that enables efficient communication with a game server.

According to an embodiment of the present invention, a recorded medium readable by a digital processing device tangibly embodies a program of instructions executable by the digital processing device for implementing an on-line game menu display by FLASH program module. The recorded medium includes a FLASH program module that includes flash graphic data and action scripts associated with the FLASH program module graphic data. The FLASH program module analyzes the FLASH program module graphic data and the action scripts. The recorded medium also includes a platform program installed on a client for transmitting game processing functionality through communication with a game server. In response to a user request for information which requires communication with the game server, the FLASH program module provides a parameter corresponding to the user request to the platform program. The platform program analyzes the parameter and requests that the game server provides the information to the FLASH program module.

According to another embodiment of the present invention, a method for displaying an on-line game menu screen using FLASH program module where the on-line game menu screen is displayed by a FLASH program module and a platform program is provided. The method includes receiving a user request for information at a game menu screen displayed by the FLASH program module. The FLASH program module calls an action script to provide a first parameter corresponding to the user request to the platform program when communication with a game server is required to obtain the information associated with the user request. The platform program receives the information associated with the user request in response to receiving the first parameter from the FLASH program module. The platform program provides the received information to the FLASH program module as a second parameter.

According to another embodiment of the present invention, a method for displaying an on-line game menu screen using FLASH program module where the on-line game menu screen is displayed by a FLASH program module and a platform program is provided. The method includes receiving a user request for information at a game menu screen displayed by the FLASH program module. The FLASH program module calls an action script to provide a first parameter corresponding to the user request to the platform program when communication with a game server is required to obtain the information associated with the user request. The platform program receives the information associated with the user request in response to receiving the first parameter from the FLASH program module. The platform program provides the received information to the FLASH program module as a second parameter.

DETAILED DESCRIPTION

Hereinafter, embodiments of the present invention will be described with reference to the accompanying drawings.

Figure 1:
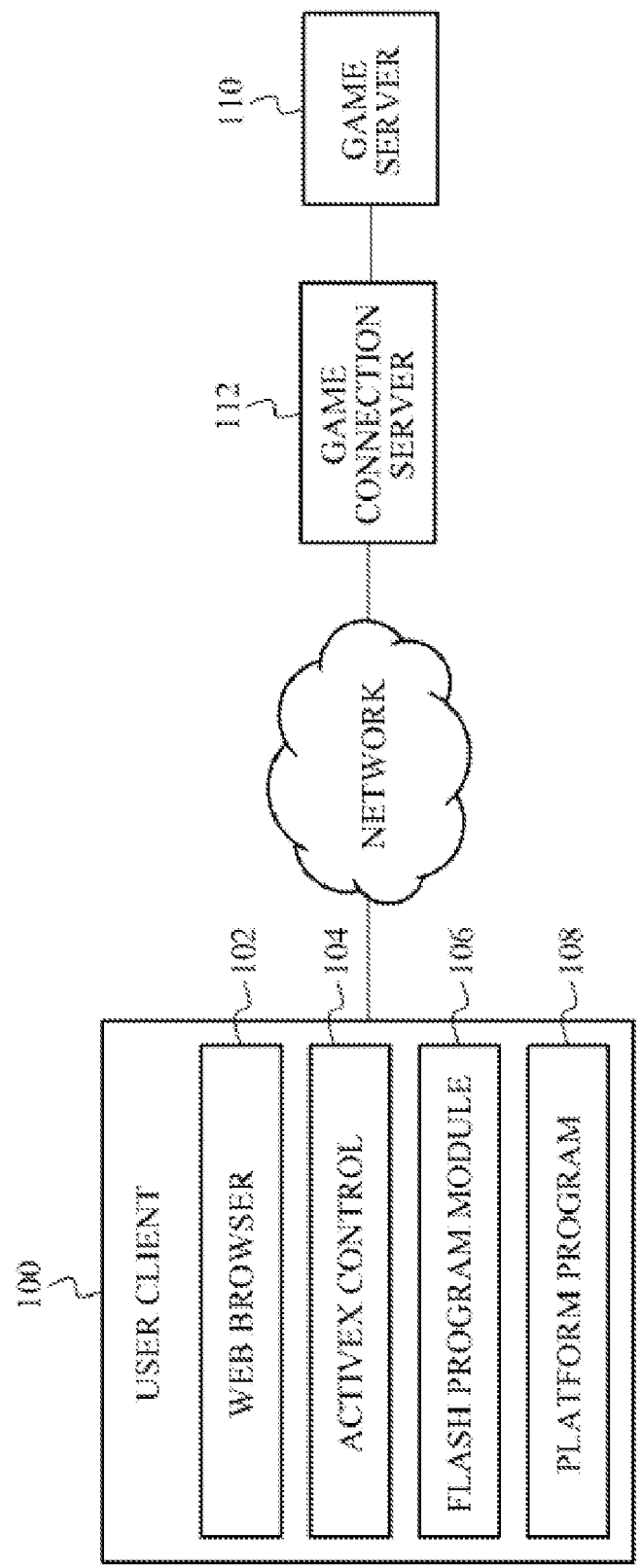
FIG. 1 illustrates a system where a method for implementing a game menu screen using a FLASH program module of the present invention is applied.

FIG. 1 illustrates a system where a method for implementing a game menu screen using a FLASH program module of the present invention is applied.

Referring to FIG. 1, the system includes a user client 100, a game server 110 and a game connection server 112. The game server 110 is coupled to the game connection server 112. The game connection server 112 is coupled to the user client 100 by a network. A web browser 102, an ActiveX Control 104, a FLASH program module 106 and a platform program 108 may be installed on the user client 100.

The user client 100 executes a game application through communication with the game server 110. The user client 100 may include digital data devices which can communicate through the network and operate an application program such as the web browser 102 and the platform program 108. The digital data devices may include a PC, a PDA, a digital notebook, a mobile communication terminal, and the like.

In conventional on-line games, a process for a user to connect to a game site and select a game is performed through the web browser 102. When a user connects to the game connection server 112 initially, the game connection server 112 provides a web page by which users can select a particular on-line game. The web page provided by the game connection server 112 is displayed on the web browser 102 installed on the user client 100. The on-line game may include board games such as go-stop and poker, block games or other types of on-line games.

The web page may include ActiveX Control information. The ActiveX Control 104 controls the user client 100 to execute a corresponding game when a user selects a particular game. The ActiveX Control information may be included on the web page in the form of an object tag. If the ActiveX Control 104 is not installed on the user client 100, a process for downloading the ActiveX Control 104 is performed.

When the ActiveX Control 104 is installed on the user client 100 and a user selects a game from the web page, the ActiveX Control 104 controls the user client 100 to download a platform program corresponding to the selected game.

The game selected through the web page need not be necessarily executed by the ActiveX Control 104 It would be appreciated by those skilled in the art that the selected game can also be executed in other ways such as by java script of a web page.

The platform program 108 communicates with the game server 110 and executes the selected game. Conventionally, if the platform program 108 is executed, a menu screen provides channel information for the selected game and receives selected channel information from a user for selecting a particular game room. According to selection information from the user, the game is processed. In other words, display of the menu screen and communication with the server is conventionally performed by the platform program.

As described above, because a menu screen for channel and game room selection is conventionally provided by the platform program, a programmer designs the game menu graphic data. Due to limitations of the design tool, it is difficult to provide a well-designed game menu.

Therefore, the present invention provides a method by which a game menu graphic is provided by FLASH program module, and game execution and communication with a game server is performed by a platform program.

In the present invention, the FLASH program module 106 cooperates with the platform program 108 and displays a menu screen selected by a user. The FLASH program module 106 displays a menu screen corresponding to a user-selected game. If the user inputs request information such as channel selection or game room selection, the FLASH program module 106 processes the request information by executing its script or through communication with the platform program 108.

When a game menu graphic is implemented by FLASH program module, the game menu graphic can be implemented only in accordance with a design of a FLASH program module designer. Therefore, design time can be saved when a game menu graphic is implemented by the platform program 108. Furthermore, a relatively high quality design of the game menu graphic can be achieved.

Moreover, the present invention provides a method in which efficiency can be maximized by cooperation of the FLASH program module 106 and the platform program 108. A conventional FLASH program module can perform a simple communication process such as a URL connection and the calling of java script. However, relatively complex communication could not be performed by FLASH program module, especially in socket communication. Specifically, only text data and binary data could be conventionally transmitted through FLASH program module.

In order to solve the above-mentioned problems, according to the present invention, when communication with the game server 110 is necessary to process a user request, the user request is transferred from the FLASH program module 106 to the platform program 108. The platform program 108 communicates with the game server 110 and information received from the game server 110 is transferred to the FLASH program module 106.

Through operation of the FLASH program module 106 and the platform program 108, a game menu with an improved design can be provided, and FLASH program module communication limitations can be overcome by the platform program 108.

Figure 2:
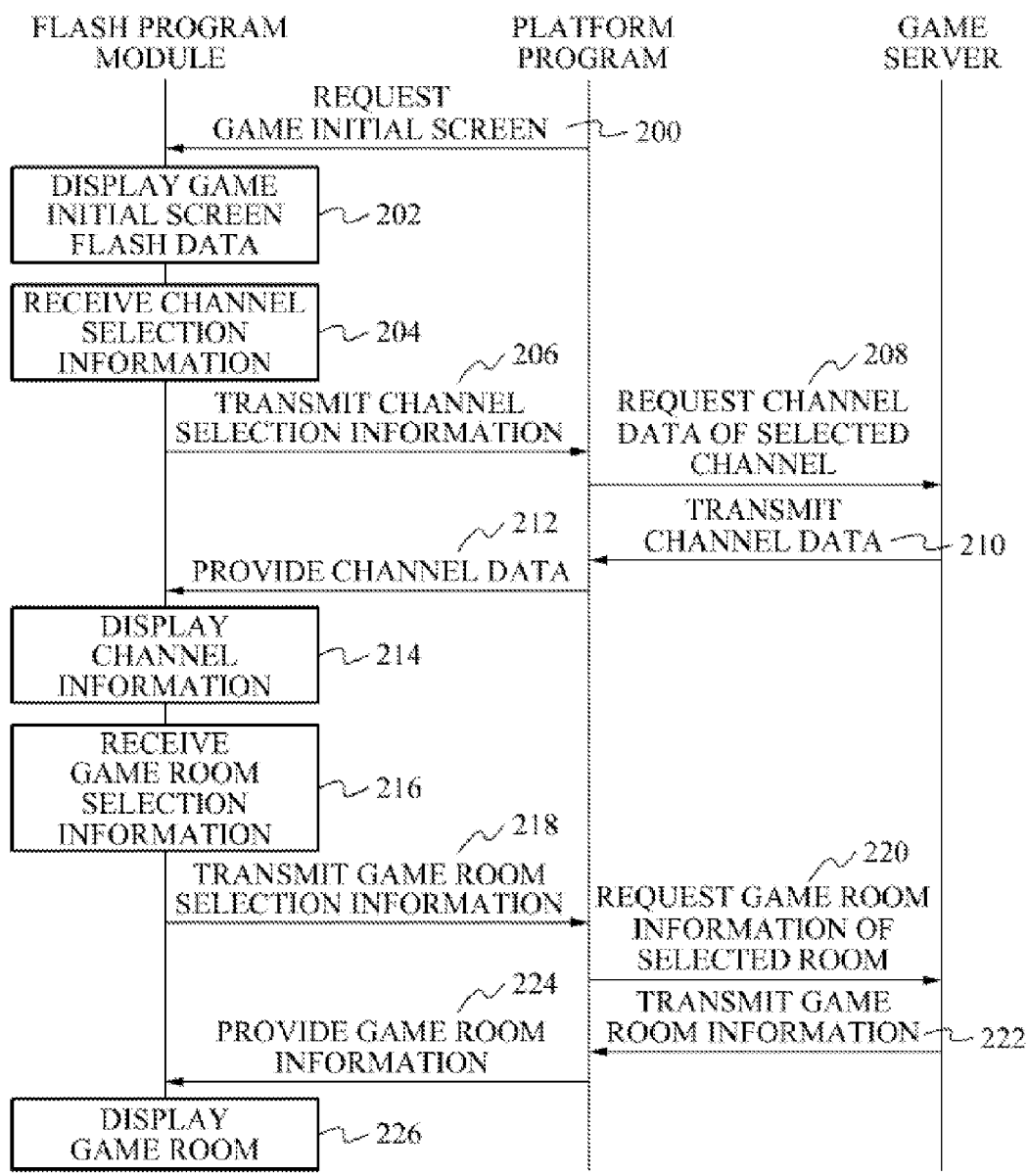
FIG. 2 is a signal flow diagram illustrating a menu screen implementing method using FLASH program module according to an embodiment of the present invention.

FIG. 2 is a signal flow diagram illustrating a menu screen implementing method using FLASH program module according to an embodiment of the present invention.

Referring to FIG. 2, when a user selects a particular game though a web page, the corresponding platform program is executed. The platform program requests the FLASH program module to display an initial screen of the selected game (operation 200). Although it is not shown in FIG. 2, when the platform program is executed, the platform program may perform a process which determines if a version update or a FLASH program module data update is necessary though communication with the game server.

The FLASH program module displays an initial screen of the selected game in response to the request from the platform program (operation 202). The FLASH program module data of the initial screen of the game may be pre-stored at the client.

In the initial screen of the game, a menu by which users can select a channel of the game is provided. The user requests a particular channel by selecting a particular channel (operation 204).

The FLASH program module that received the channel selection provides the channel selection information to the platform program (operation 206).

The platform program that received the channel selection information requests the game server to transmit data associated with the selected channel (operation 208) The platform program receives the channel data from the game server (operation 210). In one embodiment, the platform program requests and receives the channel data by a socket communication method.

The platform program provides the received channel data to the FLASH program module (operation 212). The FLASH program module displays the channel information using the received channel data (operation 214). The channel information may include game room information included in the selected channel or user information associated with the selected channel. The FLASH program module may display the channel information on a pre-stored channel information FLASH program module screen.

A user may select a game room from among the game rooms displayed on the channel information display screen, and the flash module receives the game room selection information (operation 216).

The FLASH program module that received the game room selection information transmits the selection information to the platform program (operation 218).

The platform program that received the game room selection information requests the game server to transmit information associated with the selected game room (operation 220). The platform program that received the game room selection information then receives the selected game room information (operation 222). In one embodiment, the platform program requests and receives the game room information by a socket communication method.

The platform program provides the game room information to the FLASH program module (operation 224). The FLASH program module displays the game room information on the predetermined game room FLASH program module screen (operation 226).

Information such as channel information and game room information provided from the game server is a relatively large amount of data. This large amount of data can be transmitted and received effectively by a socket communication method. As described above, the user request is provided to the platform program and the platform program communicates with the game server. The received channel information and the game room information is not displayed by the platform program. Rather, the received channel information and the game room information is displayed by the FLASH program module which receives this information from the platform program.

As such, according to the present invention, role allocation for graphics processing and communication can be performed effectively through communication between the FLASH program module and the platform program. The detailed communication method between the FLASH program module and the platform program is described below.

Figure 3:
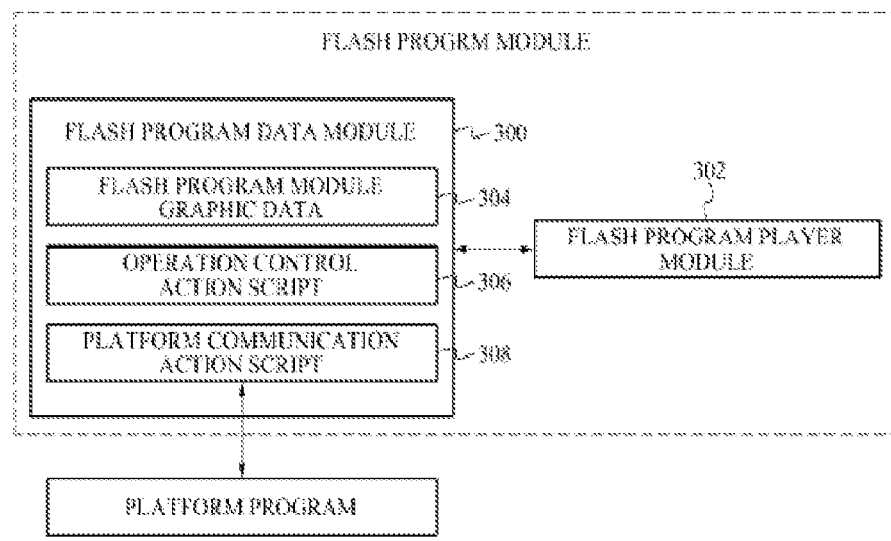
FIG. 3 is a block diagram illustrating a FLASH program module according to an embodiment of the present invention.

FIG. 3 is a block diagram of a FLASH program module according to an embodiment of the present invention.

Referring to FIG. 3, the FLASH program module may include a FLASH program data module 300 and a FLASH program player module 302. The FLASH program data module 300 may include FLASH program graphic data 304, an operation control action script 306 and a platform communication action script 308.

The FLASH program module graphic data 304 is data for displaying graphics externally by a FLASH program module player. As described above, the graphic design can be implemented by a FLASH program module designer, rather than a programmer. The FLASH program module graphic data may include FLASH program module data for an initial game screen, FLASH program module data for a channel information screen, FLASH program module data for a game room screen, and the like. It would be appreciated by those skilled in the art that various types of FLASH program module data can be provided depending on the particular game application.

The FLASH program module data for an initial game screen and the FLASH program module data for channel information may be stored in separate FLASH program module files or in a unified FLASH program module file.

When FLASH program module data for each screen are stored in separate files, the FLASH program module data corresponding to a user request is loaded by the FLASH program player module 302. When different FLASH program module data is stored in a single FLASH program module file, only the FLASH program module layer corresponding to the user request is displayed and the other layers are hidden.

Action script includes the operation control action script 306 and the platform communication action script 308. The operation control action script 306 controls an internal FLASH program module operation in accordance with predetermined events. For example, when a user positions a mouse cursor on a channel interface, the operation control action script 306 controls the FLASH program module player to display information on a corresponding channel (e.g., age restriction information for accessing the channel). In another example, when a user selects an icon, the operation control action script 306 controls the FLASH program module player to perform animation of a character.

The platform communication action script 308 provides a user request to the platform program when communication with the game server is necessary to process the user request. The platform communication action script 308 receives data from the platform program and processes the data using a predetermined processing method. For example, when channel information is provided from the platform program, the platform communication action script 308 displays the channel information on the FLASH program module screen.

Specifically, the platform communication action script 308 calls a function of the platform program and provides a parameter to the function to provide the user request to the platform program. The platform program calls the platform communication action script 308 associated with the information to be provided and provides the information to the called script as a parameter.

The FLASH program player module 302 displays FLASH program module graphic data on the client and analyzes the operation control action script 306 or the platform communication action script 308 to execute a process predetermined by the script when a predetermined event occurs. The FLASH program player module 302 displays the FLASH program module graphic data that may be installed on the user client in the form of ActiveX Control, such as general flash.ocx. It would be appreciated by those skilled in the art that the FLASH program player module 302 can be installed on the user client in forms other than ActiveX Control.

Figure 4:
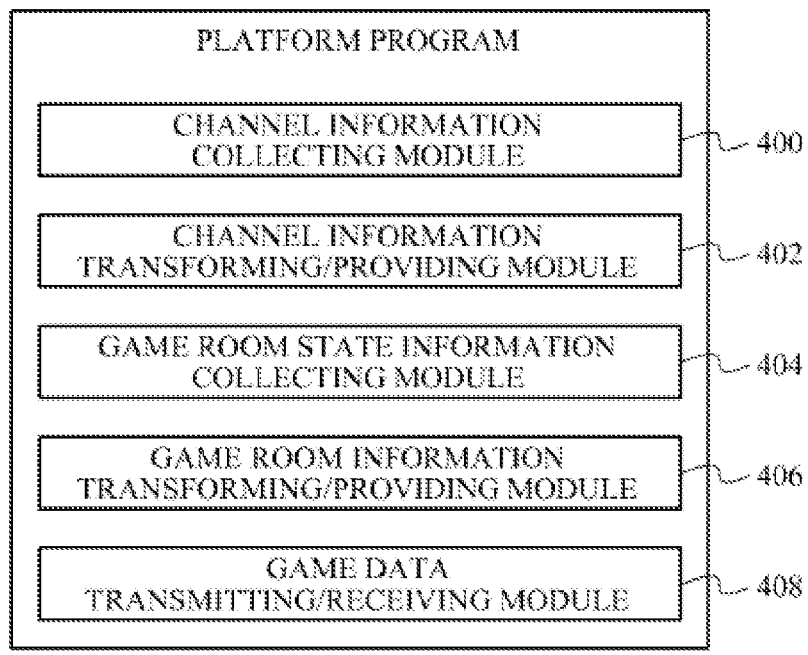
FIG. 4 is a block diagram illustrating a module of the platform program according to an embodiment of the present invention.

FIG. 4 is a block diagram illustrating a module of the platform program according to an embodiment of the present invention.

Referring to FIG. 4, the platform program according to an embodiment of the present invention may include a channel information collecting module 400, a channel information transforming/providing module 402, a game room information collecting module 404, a game room information transforming/providing module 406 and a game data transmitting/receiving module 408.

The channel information collecting module 400 receives channel information through communication with the game server. When a user requests channel information of a particular channel through FLASH program module, the platform communication action script of FLASH program module provides the user request through communication with the platform program. The channel information collecting module 400 is called and the channel information collecting module 400 receives the channel information from the game server. According to an embodiment of the present invention, the FLASH program module player analyzes the platform communication action script and provides a parameter corresponding to the channel information request to the platform program. The channel information collecting module 400 provides the channel information corresponding to the parameter to the FLASH program module player.

The channel information transforming/providing module 402 transforms the channel information into a predetermined format data. The channel information is received by the channel information collecting module 400. The channel information transforming/providing module 402 provides the transformed channel information to the FLASH program module. The transformed data format may be one of various types. For example, the transformed data may be in an XML format or a string data format. According to an embodiment of the present invention, the channel information transforming/providing module 402 calls platform communication action script that displays channel information on the screen through communication with the FLASH program module player and provides the channel information as a parameter.

The game room information collecting module 404 receives game room information through communication with the game server. When a user requests game room information through FLASH program module, the corresponding platform communication action script is called and the FLASH program module player provides the user request through communication with the platform program. The game room information collecting module 404 is called and receives the requested game room information from the game server.

According to an embodiment of the present invention, the FLASH program module player analyzes platform communication action script and provides a parameter corresponding to the requested game room information to the platform program. The game room information collecting module 404 collects game room information corresponding to the parameter provided from the FLASH program module player.

The game room information transforming/providing module 406 transforms the game room information received by the game room information collecting module 404 into the predetermined format data. The game room information transforming/providing module 406 provides the transformed information to the FLASH program module. As described above, the data format of the transformed game room information may be one of various types. According to an embodiment of the present invention, the game room information transforming/providing module 406 calls platform communication action script that displays the game room information on the FLASH program module screen through communication with the FLASH program module player and provides the game room information as a parameter.

The game data transmitting/receiving module 408 transmits game data generated by user input or by an occurrence of a predetermined event. The game data transmitting/receiving module 408 receives game data generated from other clients by user input or by the occurrence of a predetermined event through the game server.

In FIG. 4, only modules for communication with the game server and the FLASH program module are shown to implement a game menu screen with FLASH program module. As would be appreciated by those skilled in the art, additional modules can be further included for processing a game application. Moreover, as shown in FIG. 4, channel information and game room information are shown as data provided to the FLASH program module. As would be appreciated by those skilled in the art additional information could be transmitted/received between the FLASH program module and the platform program depending on the particular game application.

Figure 5:
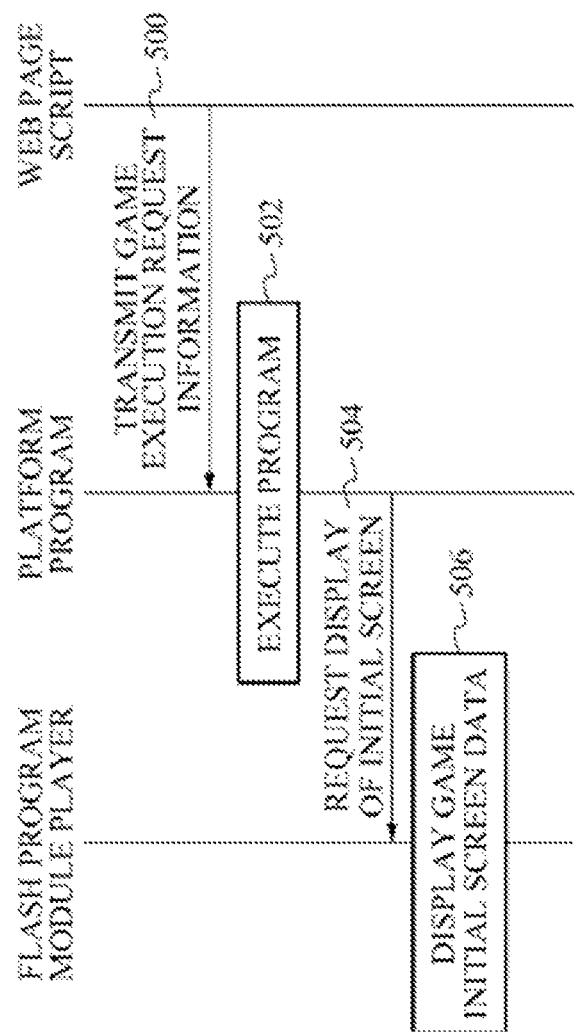
FIG. 5 is a signal flow diagram illustrating a start operation of a platform program and a FLASH program module player according to user game selection information.

FIG. 5 is a signal flow diagram illustrating a start operation of the platform program and the FLASH program module player according to game selection information.

Referring to FIG. 5, when a user selects a game among a variety of games provided by a game site through a web browser, the script for executing the selected game requests execution of the platform program (operation 500). In response to the request of the script, the platform program is executed (operation 502). In one embodiment, the platform program may also be executed by an ActiveX Control associated with the web page.

During execution of the platform program, the platform program requests the flash player to display an initial game screen (operation 504). According to an embodiment of the present invention, the platform program provides flash file information corresponding to initial screen data as a parameter to the flash player.

The FLASH program module player displays the initial game screen using the parameter provided from the platform program (operation 506).

Figure 6:
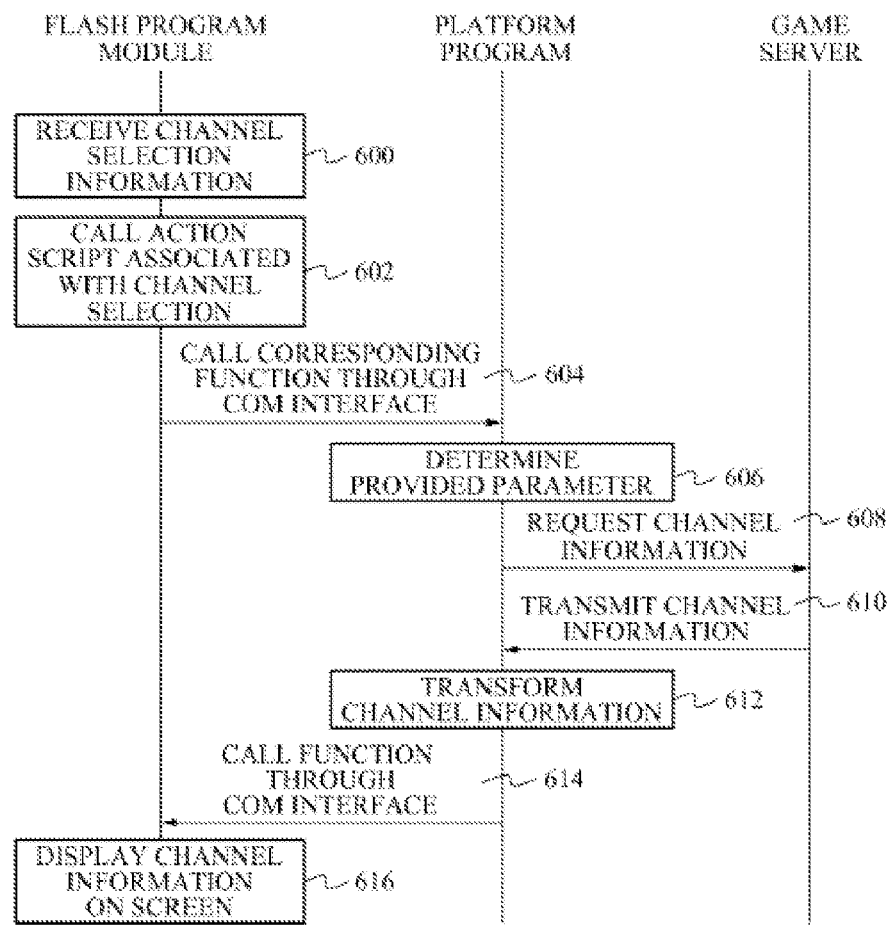
FIG. 6 is a signal flow diagram illustrating a process for displaying channel information on a game menu screen implemented by FLASH program module according to an embodiment of the present invention.

FIG. 6 is a signal flow diagram illustrating a process for displaying channel information on a game menu screen implemented by FLASH program module according to an embodiment of the present invention.

Referring to FIG. 6, the FLASH program module receives selected channel information (operation 600). In one embodiment, the channel may be selected by a mouse. In response to user selection of the channel, the action script associated with the channel selection is called (operation 602).

In response to the called action script, a parameter corresponding to the selected channel information is provided from the FLASH program module and a function of the platform program is called. According to an embodiment of the present invention, when the FLASH program module calls the function of the platform program, a function such as FSCommand( ) can be used. Generally, FSCommand( ) is used for calling java script of a webpage or for communication between a swf FLASH program module file and a FLASH program module player. However, according to the present invention, FSCommand( ) is used to provide the user request to the platform program. The platform program processes the user request. When the FLASH program module provides a parameter corresponding to a channel request as the parameter of FSCommand( ) the platform program determines that the FLASH program module requests channel information through the parameter.

According to an embodiment of the present invention, the FLASH program module calls the function of the platform program through a COM interface.

The platform program determines that channel information for a specified channel is requested when a function is called (operation 606). The platform program requests the channel information for the corresponding channel from the game server (operation 608). The game server provides the requested channel information to the platform program (operation 610).

The platform program transforms the received channel information into a predetermined format data (operation 612). The platform program then calls the function that processes the channel information display through a COM interface. The function that processes the channel information display may be action script included in the flash data. The platform program provides a parameter corresponding to the channel information when calling "function(action script)".

The FLASH program module displays the corresponding channel information on the predetermined screen using the parameter corresponding to the channel information provided from the platform program (operation 616).

A method for providing/requesting channel information to/from the FLASH program module has been described with reference to FIG. 6. As would be appreciated by those skilled in the art game room information or other information can also be communicated between the FLASH program module and the platform program through the method described with reference to FIG. 6.

As described above, according to an embodiment of the present invention, game menu design time can be reduced and a game menu screen with improved graphics can be provided.

Further, according to an embodiment of the present invention, efficient communication with a game server can be performed using a FLASH program module—implemented game menu.

The accompanying drawings and the detailed description are only examples of the present invention and do not limit the scope of the present invention. Therefore, those who skilled in the art would appreciate that many changes and equivalent embodiments can be made without departing from the present invention. Thus, the true scope of the present invention is determined by the accompanying claims.

What is claimed is:

1. A computer implemented method for displaying a game menu using a FLASH program module via a network, the method comprising:
   providing a game menu screen via the FLASH program module;
   receiving a request for information of the game menu screen displayed by the FLASH program module;
   in response to receipt of the request for information, calling out an action script comprising a first script and a second script, the first script controls the FLASH program module to perform animation of a character and the second script displays channel information of the request via the FLASH program module, the channel information being converted into a format to display the channel information, the conversion is performed by analyzing the second script corresponding to the request communicated from a game server, the request being provided to a platform to communicate with the game server to receive the channel information; and
   providing the information of the request to the FLASH program module by transforming the channel information into the format.

2. The method of claim 1, wherein the information of the request comprises the channel information and a game room information.

3. The method of claim 1, wherein calling out an action script comprises calling a function of a platform program to provide a first parameter.

4. The method of claim 3, wherein calling out the action script comprises calling FSCommand( ) of the platform program to provide the first parameter.

5. The method of claim 1, wherein providing the information to the FLASH program module comprises calling out an action script of the FLASH program module corresponding to a second parameter.

6. The method of claim 1, further comprising:
   calling out a function or an action script through a COM interface by a FLASH program module comprising a platform program.

7. The method of claim 1,
   wherein the format comprises an extensible markup language (XML) format or a string data format.

8. A computer implemented method for displaying a game menu screen by using a FLASH program module, the method comprising:
   providing a FLASH program module and a platform program to a user client;
   receiving a request for information of the game menu via the platform program;
   transmitting data corresponding to the request to the user client;
   in response to detection of the information associated with the request requires communication with a server, providing a parameter corresponding to the request from the FLASH program module to the platform program, wherein the parameter is converted into a format;
   requesting channel information associated with the parameter from the server;
   receiving the requested channel information; and
   providing the received information by transforming the channel information into the format to the FLASH program module.

9. The method of claim 1, wherein the first script comprises an operation control action script and the second script comprises a platform communication action script.

10. The method of claim 9, wherein the format comprises an extensible markup language (XML) format or a string data format.

* * * * *